US012717620B1

(12) United States Patent
Parchure et al.

(10) Patent No.: US 12,717,620 B1
(45) Date of Patent: Aug. 25, 2026

(54) PROVIDING SCALABLE ELECTRICAL GRID SIMULATIONS

(71) Applicant: Amazon Technologies, Inc., Seattle, WA (US)

(72) Inventors: Abhineet Himanshu Parchure, Sammamish, WA (US); Elizabeth Chaos Golubitsky, Somerville, MA (US); Adam Charles Siefker, Des Moines, WA (US); Matthew Markoff, Seattle, WA (US); Suyash S Jape, Renton, WA (US); Jason Choong, Belmont, CA (US); Nicholas Rheid Hubbard, Seattle, WA (US); Alexandra Movsesyan, Seattle, WA (US); Venkata Aravind Sai Vaddi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 446 days.

(21) Appl. No.: 18/345,997

(22) Filed: Jun. 30, 2023

(51) Int. Cl.

| | |
|---|---|
| ***G06F 3/048*** | (2013.01) |
| ***G06F 9/50*** | (2006.01) |
| ***G06F 30/3308*** | (2020.01) |
| ***H02J 3/00*** | (2006.01) |
| *G06F 113/04* | (2020.01) |
| *H02J 103/30* | (2026.01) |

(52) U.S. Cl.
CPC ............ *G06F 9/50* (2013.01); *G06F 30/3308* (2020.01); *H02J 3/003* (2020.01); *G06F 2113/04* (2020.01); *H02J 2103/30* (2026.01)

(58) Field of Classification Search
CPC .... G06F 9/50; G06F 30/3308; G06F 2113/04; H02J 3/003; H02J 2203/20
See application file for complete search history.

(56) References Cited

U.S. PATENT DOCUMENTS

| | | | | |
|---|---|---|---|---|
| 9,740,803 | B2 | 8/2017 | Hoff | |
| 9,863,985 | B2 | 1/2018 | Giannakis | |
| 9,864,634 | B2 * | 1/2018 | Kenkre | G06F 9/50 |
| 9,898,566 | B2 | 2/2018 | Iskander | |
| 10,289,780 | B1 | 5/2019 | Verma | |
| 10,460,057 | B2 | 10/2019 | Li | |

(Continued)

OTHER PUBLICATIONS

U.S. Appl. No. 18/346,010, filed Jun. 30, 2023, Abhineet Himanshu Parchure.

(Continued)

*Primary Examiner* — David Phantana-angkool
(74) *Attorney, Agent, or Firm* — Robert C. Kowert; Kowert, Hood, Munyon, Rankin & Goetzel, P.C.

(57) ABSTRACT

A grid simulation (GS) service performs scalable electrical grid simulations for clients of the service. The GS service receives, from a client (e.g., a utility/grid operator), a request to initiate a simulation session for an electrical grid. Based on the request, the service determines an initial amount of compute capacity to be provisioned for the simulation session. The service initiates the simulation session and provisions the initial amount of compute capacity. The service receives a request to implement a number of electrical grid simulations. If needed, the service will scale up or down the amount of compute capacity to implement the requested electrical grid simulations. The results may be provided to an endpoint.

20 Claims, 12 Drawing Sheets

(56) References Cited

U.S. PATENT DOCUMENTS

| | | | | |
|---|---|---|---|---|
| 11,829,699 | B1 * | 11/2023 | Mathuriya | H01L 25/105 |
| 12,175,171 | B2 * | 12/2024 | Laneryd | G06F 30/20 |
| 2002/0193978 | A1 | 12/2002 | Soudier | |
| 2006/0010435 | A1 | 1/2006 | Jhanwar | |
| 2012/0191439 | A1 * | 7/2012 | Meagher | G06F 30/20 703/18 |
| 2015/0357817 | A1 * | 12/2015 | Van Den Briel | H02J 3/003 700/291 |
| 2017/0228653 | A1 | 8/2017 | Meagher et al. | |
| 2018/0308199 | A1 * | 10/2018 | Vembu | G06T 15/506 |
| 2022/0100158 | A1 * | 3/2022 | Elbsat | H02J 3/32 |
| 2022/0115867 | A1 * | 4/2022 | Ratnayake | H02J 3/0012 |
| 2022/0300679 | A1 | 9/2022 | Casey | |
| 2023/0402844 | A1 * | 12/2023 | Ginsberg | H02J 3/003 |
| 2024/0249044 | A1 * | 7/2024 | Gupta | G06F 30/27 |
| 2024/0411950 | A1 * | 12/2024 | Khalilinia | G06F 21/6218 |
| 2024/0429740 | A1 * | 12/2024 | Ali | H02J 13/00002 |
| 2025/0210996 | A1 * | 6/2025 | Yang | H02J 3/466 |

OTHER PUBLICATIONS

U.S. Appl. No. 18/346,016, filed Jun. 30, 2023, Abhineet Himanshu Parchure.

* cited by examiner request to simulate 300 power flows
(e.g., 30 circuits; 10 scenarios each)

Power flow simulation session
200

Container Container Container Container Container

Container Container Container Container Container

Container Container Container Container Container increased workload; service scales up compute capacity
(e.g., add more containers, compute instances, etc.)

Power flow simulation session
300

Container
Container
Container
Container
Container
Container
Container
Container
Container
Container reduced workload; service scales down compute capacity
(e.g., remove containers, compute instances, etc.)

PROVIDING SCALABLE ELECTRICAL GRID SIMULATIONS

BACKGROUND

As demand for electricity grows, electric utilities and grid operators are leveraging computers to manage the generation and distribution of electricity. For example, electrical grid simulation has become an important tool for the planning and operation of electric grids (e.g., power flow simulation, electromagnetic simulation, electromechanical simulation, short circuit analysis). Performing electrical grid simulations can improve both capacity and reliability in the face of accelerating challenges related to growing demand and new technology (e.g., electric vehicles and intermittent generation from renewable energy sources). For example, a grid operator can run electrical grid simulations in order to determine the maximum current load to be applied to a circuit. However, running electrical grid simulations in order to obtain useful results may take days, weeks, or longer, particularly if many simulations are needed. This may result in less reliable operation and power outage. Furthermore, the type of grid simulation solver that a grid operator uses to implement a particular electrical grid simulation may not be as useful and efficient as other types of grid simulation solvers used by other grid operators.

Figure 1:
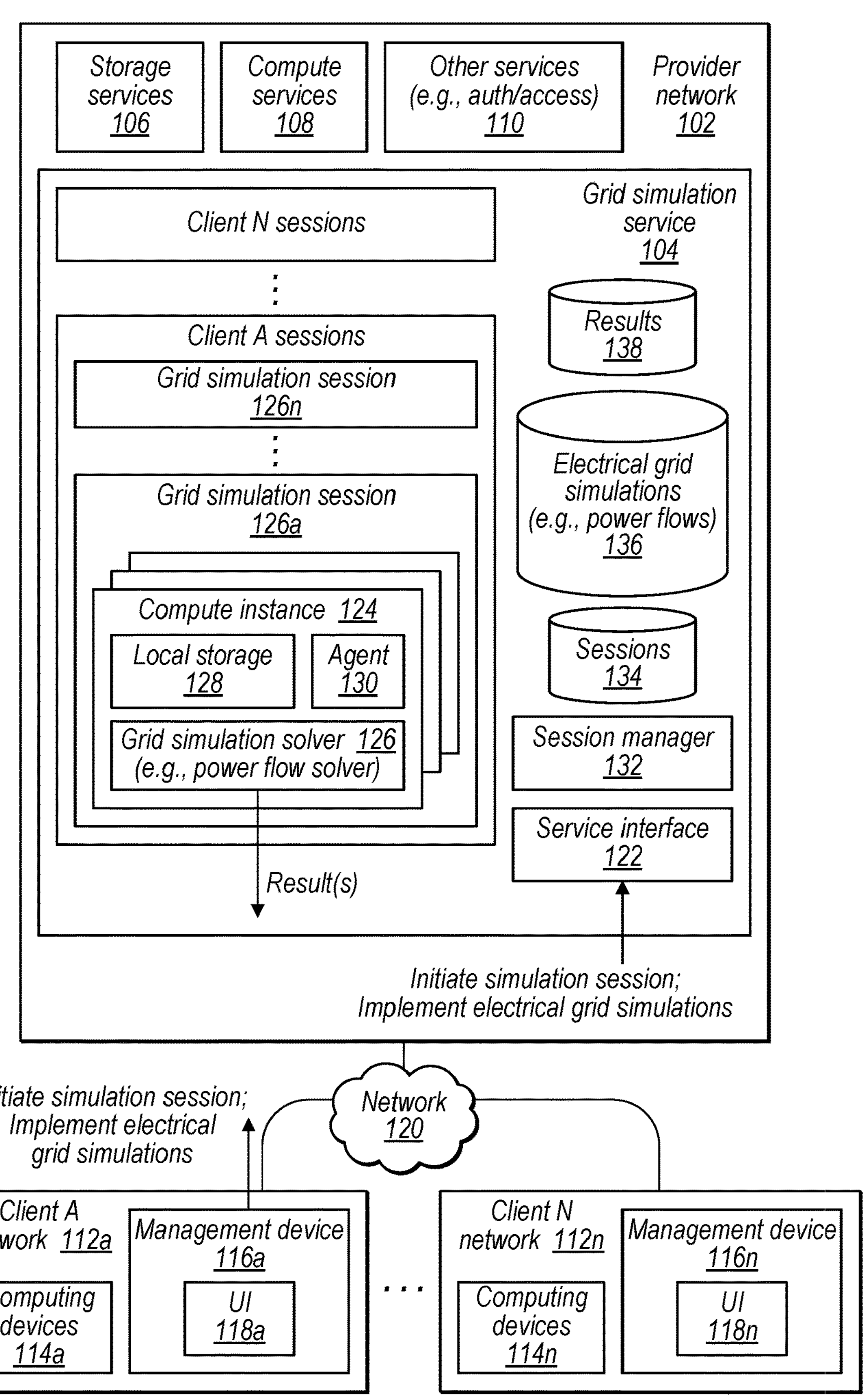
FIG. 1 is a logical block diagram illustrating a system for providing scalable electrical grid simulations, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to provide scalable electrical grid simulations for clients of a grid simulation (GS) service of a service provider network, according to some embodiments. The systems and methods described herein may also be employed in various combinations and in various embodiments to manage execution of an electrical grid simulation for clients of a GS service of a service provider network, according to some embodiments. The systems and methods described herein may also be employed in various combinations and in various embodiments to provide solvers for execution of an electrical grid simulation for clients of a GS service of a service provider network, according to some embodiments.

In various embodiments, a client may be an electric utility, a grid operator, or any other type of customer that may have a desire and/or need to implement power flow simulations. In embodiments, a client may include any number of users (e.g., administrators, engineers, or other personnel) that use a GS service of a service provider network (e.g., via a service interface of the GS service). In various embodiments, an electrical grid simulation may include any type of simulation of an electrical grid, depending on the client's needs (e.g., power flow simulation, electromagnetic simulation, electromechanical simulation, and/or short circuit analysis, etc.). Therefore, an electrical grid simulation may simulate any number of electrical and/or physical properties of the electrical grid in order to provide any number of results of the simulation (electrical and/or physical properties of the electrical grid such as current, voltage, etc.). Although a certain type of electrical grid simulation may be used in any give example herein, in various embodiments the example may apply to any type of electrical grid simulation. For example, any discussion of a power flow simulation may also and/or instead apply to any type of electrical grid simulation, in embodiments.

In embodiments, a GS service may be used by any number of different clients (e.g., businesses, organizations, or other customers of the service provider network) to provide highly scalable electrical grid simulations, to automatically manage execution of an electrical grid simulation in order to answer various planning or operation questions a client may have regarding an electrical grid/power grid, and/or to provide access to a variety of different types of grid simulation solvers for execution of an electrical grid simulation. Traditional techniques for running electrical grid simulations using computers at a client's site may take days, weeks, or longer, particularly if many simulations are needed. Moreover, managing execution of a given electrical grid simulation using traditional techniques at a client's site may burdensome, error-prone, and time-consuming. Furthermore, the client may be limited to a small number of grid simulation solvers to run simulations at the client's site (e.g., 1 or 2 types of solvers), which may not be as useful and efficient as other types of grid simulation solvers used by other grid operators.

Techniques described herein may use scaling and/or parallel execution of electrical grid simulations at a GS service to allow a client to obtain simulation results much faster than using traditional techniques. Furthermore, techniques described herein managing execution of a given electrical grid simulation may be less burdensome, error-prone, and time-consuming than using traditional techniques, and require fewer human resources and/or computing resources at the client's site. Moreover, techniques described herein may provide much more flexibility and choice regarding the type of grid simulation solver to be used to simulate electrical grid simulations, compared to traditional techniques.

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 12 and described below.

This specification begins with a description of a system for providing scalable electrical grid simulations, for managing execution of an electrical grid simulation, and for providing solvers for execution of an electrical grid simulation. A number of different methods and techniques for providing scalable electrical grid simulations, for managing execution of an electrical grid simulation, and for providing solvers for execution of an electrical grid simulation are discussed, some of which are illustrated in accompanying flowcharts. Finally, a description of an example computing system upon which the various components, modules, systems, and/or techniques described herein may be implemented is provided. Various examples are provided throughout the specification.

FIG. 1 is a logical block diagram illustrating a system for providing scalable electrical grid simulations, according to some embodiments.

As shown, a provider network 102 of a service provider includes a grid simulation (GS) service 104 that provides scalable electrical grid simulations. In the example embodiment, the provider network 102 also includes any number of storage services 106 and compute services 108, as well as any number of other services 110, such as services that authorize clients to use services of the provider network and/or services that provide access to data and/or services to clients (e.g., different levels of access to different clients and/or users).

In embodiments, any of the compute and/or storage functionality described for the GS service 104 may be provided, at least in part, by one or more of the other services 106, 108, 110. For example, a storage service 106 may store results of simulations for different clients of the GS service 104 and/or a compute service 108 may perform simulations for different clients of the GS service 104.

In various embodiments, any number of clients of the GS service 104 may each have one or more client networks 112, and a given client network may include any number of computing devices 114. At least one of the computing devices 114 may be a management device 116 with a user interface that allows a user to access the service via a service interface 118. For example, client network 112*a* of a client includes computing devices 114*a* and a management device 116*a*. In embodiments, clients of the GS service 104 may use the GS service 104 by communicating with the provider network 102 from a remote client network 112 of the corresponding client (e.g., via a wide area network 120, such as the internet).

As depicted, the GS service 104 includes a service interface 122 (e.g., a management API) that may receive user input (e.g., data, selections) from a management device 116 of a remote client network 112 (e.g., via a user interface provided by a display of the management device, a command line interface, API commands or requests, etc.). For example, a user may provide input via a graphical user interface or command line interface of the display.

As shown, the service interface 122 of the GS service receives user input from the management device 116*a* that includes a request to initiate a simulation session and a request to implement any number of electrical grid simulations. In response to receiving the request initiate a simulation, the service determines an initial amount of compute capacity (e.g., initial number of compute instances 124, initial number of containers, initial amount of hardware and/or software resources, etc.) to be provisioned for the simulation session 126. For example, the request may indicate the initial number of containers or the initial number may be assigned according to a default initial number. The service may then initiate the simulation session and provision the initial amount of compute capacity for the session.

Although the depicted example shows the initial amount of compute capacity as an initial number of compute instances 124, in various embodiments any type/unit of hardware and/or software compute capacity me be provisioned in order to run/execute a solver in a session (e.g., compute nodes, virtual compute nodes, containers, CPUs and/or memory, etc.). In some embodiments, a container may be a package and/or object that includes application code, configurations, and/or dependencies and may be run as a process. In some embodiments, a compute instance may be a virtual machine that uses CPU, memory, storage, and/or networking resources that may be used to implement/execute applications (e.g., a solver).

In the depicted example, a given compute instance (or container, etc.) is configured to use a grid simulation solver 126 to implement electrical grid simulations on behalf of the client (e.g., execute/run electrical grid simulations). A given compute instance includes local storage 128 and an agent 130. In embodiments, the agent 130 may manage the execution of the grid simulation solver to run an electrical grid simulation, store/retrieve data in the local storage, and/or perform some or all of the communication between the compute instance and other components internal and/or external to the compute instance.

In embodiments, the GS service includes a session manager 132 that may perform any of the actions related to a given session 126 for a client (e.g., initiate a session, provision compute instances). As shown, the service may implement any number of simulation sessions 126 for any number of different clients. As shown, the service may store data associated with different simulation sessions (e.g., status of a session) in a sessions 134 data store and store data associated with different electrical grid simulations (e.g., a power flow simulation, status of the power flow simulation) in an electrical grid simulations 136 data store. As shown, the service may store results of simulations in a results 138 data store.

The GS service may receive a request to implement any number of electrical grid simulations. In response to receiving the request, the service determines, based on the request, an amount of compute capacity for the simulation session to be used to implement the electrical grid simulations; implements the electrical grid simulations using the grid simulation solver and the amount of compute capacity (e.g., in respective compute instances or containers) to generate a result(s), and provides, to an endpoint (e.g., results 138 or the management device 116*a*), the result(s). In some embodiments, the request to implement a given electrical grid simulation may indicate or include a particular model of the grid and/or may indicate any number of configuration parameters for the model and/or solver (e.g., current or voltage to be applied at a particular portion of the grid).

In some cases, the service may determine, based on one or more criteria, the amount of compute capacity to be used to implement the requested number of electrical grid simulations as a larger amount of compute capacity (e.g., larger quantity of containers or compute instances) than the initial or current amount of compute capacity (e.g., initial number of containers or compute instances) in the session. For example, the criteria may include a desired deadline for providing results (e.g., indicated in the request from the client). In response, the service provisions an additional amount of compute capacity (e.g., additional number of containers or compute instances) to use the grid simulation solver to implement electrical grid simulations on behalf of the client In some cases, the service may determine, based on one or more criteria, the amount of compute capacity to be used to implement the requested number of electrical grid simulations as a smaller amount of compute capacity (e.g., smaller quantity of containers or compute instances) than the initial or current amount of compute capacity (e.g., the initial number of containers or compute instances) in the session. For example, the criteria may include a desired deadline for providing results (e.g., indicated in the request from the client). In response, the service removes a portion of the initial amount or current amount of compute capacity (e.g., removes one or more of the containers or compute instances).

In embodiments, the service may receive any additional number of requests to simulate additional electrical grid simulations. In response to receiving an additional request, the service determines, based at least on the additional request and a state of the current compute capacity, an amount of additional compute capacity of the session to be provisioned to simulate the additional power flows on behalf of the client. For example, if one or more of the current containers or compute instances are not available to simulate additional electrical grid simulations, then the service may provision one or more additional containers or compute instances to simulate the additional electrical grid simulations (e.g., such that the results of the additional simulations will be provided by a desired deadline).

In some embodiments, different containers or compute instances of a session may implement/execute different types of grid simulation solvers. For example, one type of grid simulation solvers may be used to simulate a first stage of a circuit in container A and another type of grid simulation solvers may be used to simulate another stage of the circuit in container B. In embodiments, output from one type of grid simulation solver be sent as input to another type of grid simulation solver. For example, the output/result of the solver in container A or compute instance A may be sent as input to the solver in container B or compute instance B. The output/result of the solver in container or compute instances B may then be provided to an endpoint.

In various embodiments, any number of the electrical grid simulations requested to be implemented may be implemented be solvers in parallel. For example, 50 out of 100 electrical grid simulations may be implemented in parallel, or all 100 may be implemented in parallel (e.g., by 100 different containers or compute instances) in order to achieve the results in the shortest amount of time. In some embodiments, a client may have the ability to configure the amount of software and/or hardware resources to be used for a particular simulation session or as a default for any new session (e.g., for each container or compute instance). For example, the service may receive, from a client, an indication of an amount of compute resources (e.g., number of CPUs) and/or an amount of memory to be used for each container, compute instance, or for the entire simulation session.

Figures 2A, 2B:
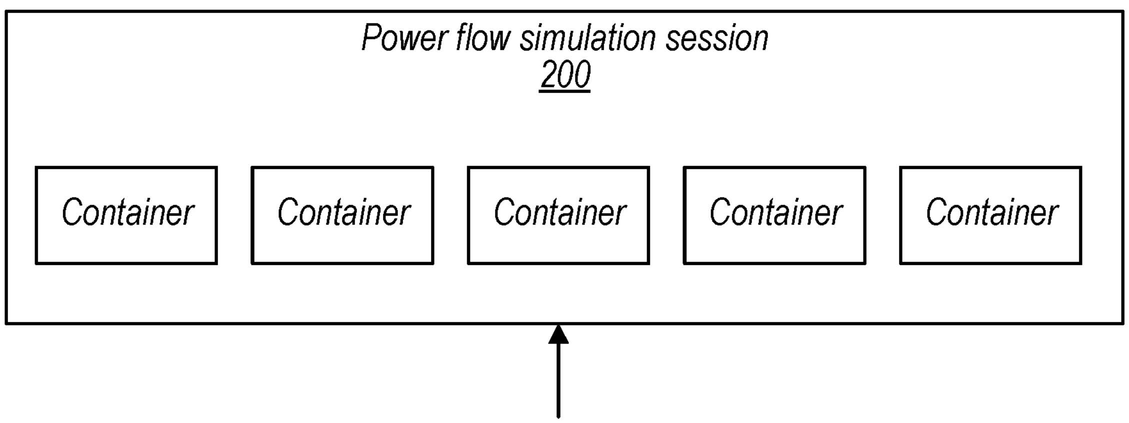
FIG. 2A is a logical block diagram illustrating compute capacity of an electrical grid simulation session, according to some embodiments.
FIG. 2B is a logical block diagram illustrating scaling up compute capacity of an electrical grid simulation session due to an increased workload, according to some embodiments.

FIG. 2A is a logical block diagram illustrating compute capacity of an electrical grid simulation session, according to some embodiments. In the depicted example, a simulation session 200 includes 5 containers (or compute instances, etc.) that are provisioned to implement electrical grid simulations. Although FIGS. 2 and 3 show containers as the units of compute capacity, in various embodiments any type/unit of hardware and/or software compute capacity me be provisioned and used for scaling compute capacity up or down depending on demand to run electrical grid simulations (e.g., compute nodes, virtual compute nodes, CPUs and/or memory, etc.).

As shown, the session receives a request to implement a simulation of 300 power flows (e.g., for 30 circuits, 10 simulation scenarios each). In response to the increased workload due to the request, the service may scale up the compute capacity for the simulation session (as discussed for FIG. 2B).

FIG. 2B is a logical block diagram illustrating scaling up compute capacity of an electrical grid simulation session due to an increased workload, according to some embodiments. As shown, the session 200 has scaled up the number of containers from 5 to 15 containers in response to the increased workload to implement the 300 power flows.

In embodiments, the number of containers to scale the service may depend on any number of factors, such as the number of currently available containers (e.g., idle or not simulating) and/or a desired deadline to provide results for the simulation of the 300 power flows. Therefore, the service may determine, based on one or more criteria (e.g., deadline to provide results and/or a desired level of confidence or accuracy of results), the amount of compute capacity to be used to implement the number of electrical grid simulations (e.g., a larger amount of compute capacity than the initial or current amount of compute capacity of the session).

Figures 3A, 3B:
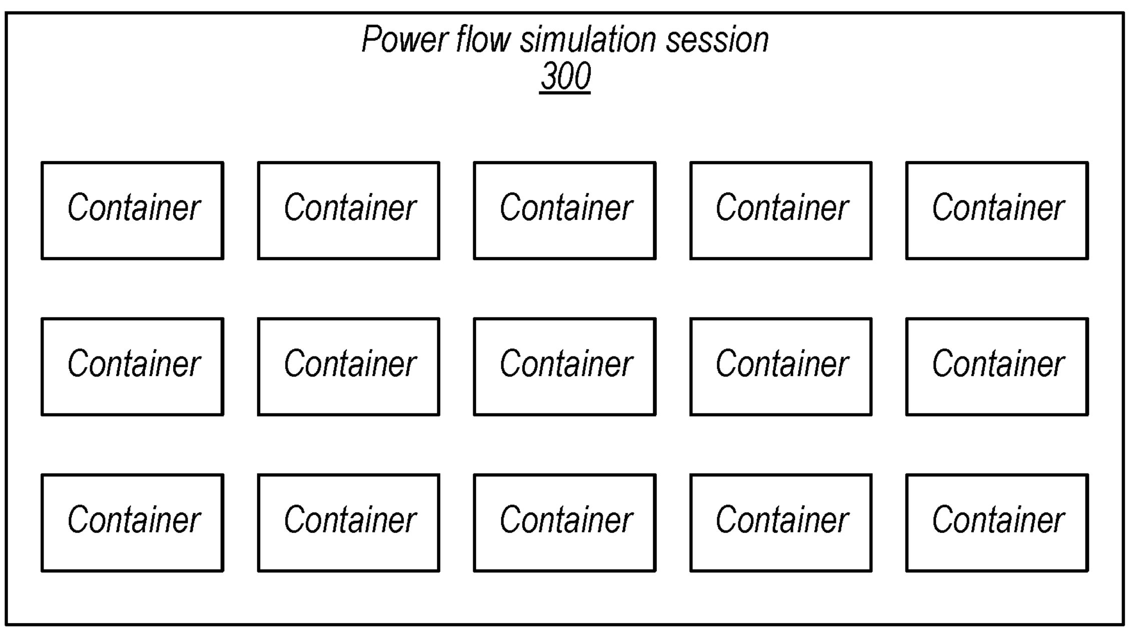
FIG. 3A is a logical block diagram illustrating compute capacity of an electrical grid simulation session, according to some embodiments.
FIG. 3B is a logical block diagram illustrating scaling down compute capacity of an electrical grid simulation session due to a decreased workload, according to some embodiments.

FIG. 3A is a logical block diagram illustrating compute capacity of an electrical grid simulation session, according to some embodiments. In the depicted example, a simulation session 300 includes 15 containers that are provisioned to simulate power flows (e.g., the session of FIG. 3B).

After a certain amount of time, the simulation for some or all of the 300 power flows may be complete and results provided. In response to the decreased workload, the service may scale down the compute capacity for the simulation session (as discussed for FIG. 2B).

FIG. 3B is a logical block diagram illustrating scaling down compute capacity of an electrical grid simulation session due to a decreased workload, according to some embodiments. As shown, the session 300 has scaled down the number of containers from 15 to 10 containers in response to the decreased workload (e.g., after some or all of the power flow simulations are completed).

In embodiments, the number of containers to scale the service to may depend on any number of factors, such as the number of currently containers that are idle and/or after one or more containers are idle for a threshold amount of time. In embodiments, the service may determine, based on one or more criteria (e.g., a number of compute instances and/or an amount of compute capacity that is idle for a threshold amount of time), the amount of compute capacity to be used to implement any requested (or remaining) electrical grid simulations as a smaller amount of compute capacity than the initial or current amount of compute capacity. For example, if a new request only indicated 10 power flow simulations and indicated results withing a certain amount of time, then the service may scale down to 10 containers. In embodiments, the service may receive a request from the client to scale the compute capacity up or down (e.g., manual scaling).

In some embodiments, the service may determine a type of compute resources instead of or in addition to the amount of compute resources to scale up or down the compute capacity of the session. For example, to scale up the compute capacity, the service may switch to using a different type of CPU(s) and/or memory that is faster than the current CPU(s) and/or memory that are provisioned for the session. Conversely, to scale down the compute capacity, the service may switch to using a different type of CPU(s) and/or memory that is slower than the current CPU(s) and/or memory that are provisioned for the session.

Figure 4:
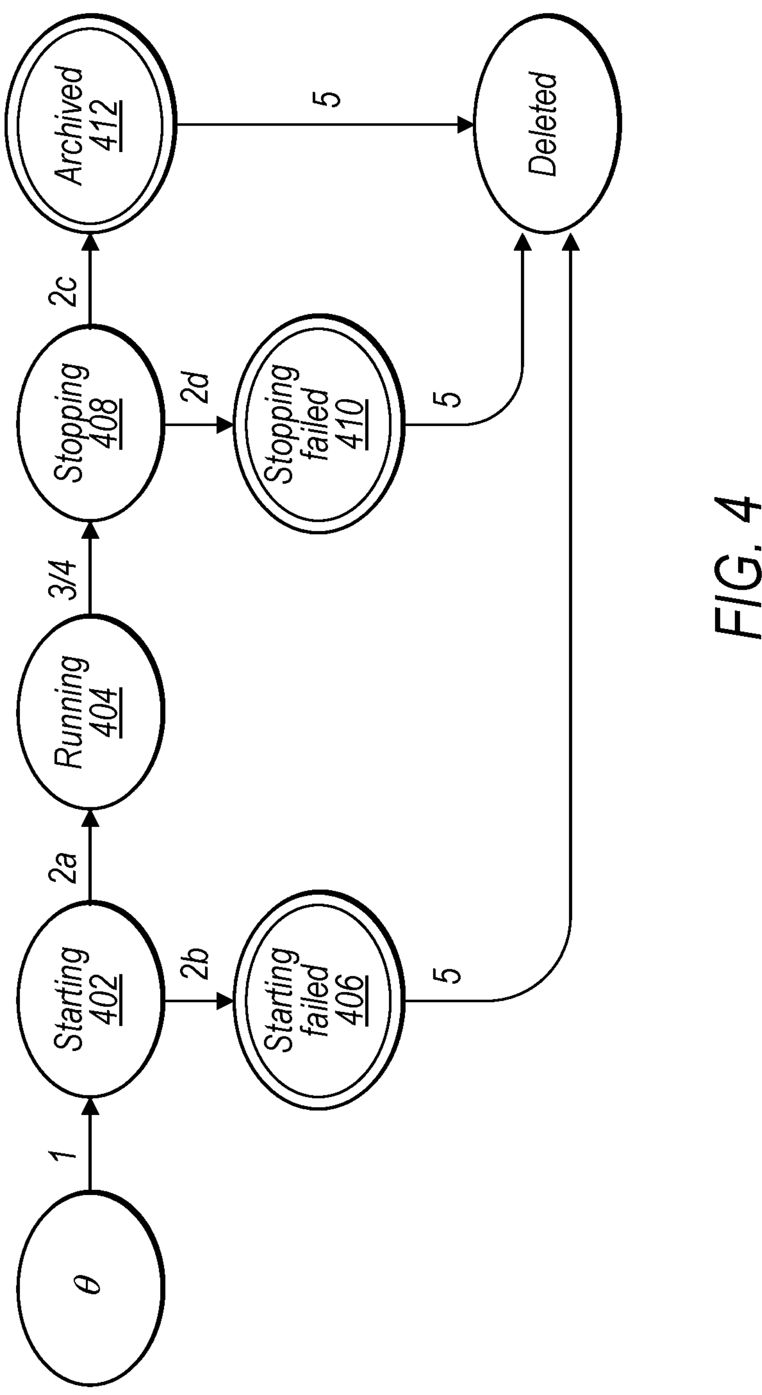
FIG. 4 is a high-level flowchart illustrating various states of a simulation session implemented by a grid simulation (GS) service, according to some embodiments.

FIG. 4 is a high-level flowchart illustrating various states of a simulation session implemented by a grid simulation (PFS) service, according to some embodiments.

The first state of the session is the starting 402 state, in which the session is created and compute capacity may be provisioned. In the running 404 state, the session is ready to accept/schedule electrical grid simulations and/or the session is currently running (e.g., after compute capacity has been provisioned). In the starting failed 406 state, a failure occurred during the provisioning of compute capacity.

In the stopping 408 state, the session does not accept any more requests to implement electrical simulations (e.g., due to a client request to complete the session). In the stopping failed 410 state, a failure occurred during the deletion/stopping of the session. In embodiments, this status is for use by the service/provider network only, because the client has no control over the cleaning up of resources. In the archived 412 state, the session has been successfully completed and results have been stored and/or sent to a destination. As shown, the session may be deleted after any of states 406, 410, and 412. In embodiments, a client may send a request to the service for the current status of any given session, and the service will return an indication of one of the above states as the current status.

Figure 5:
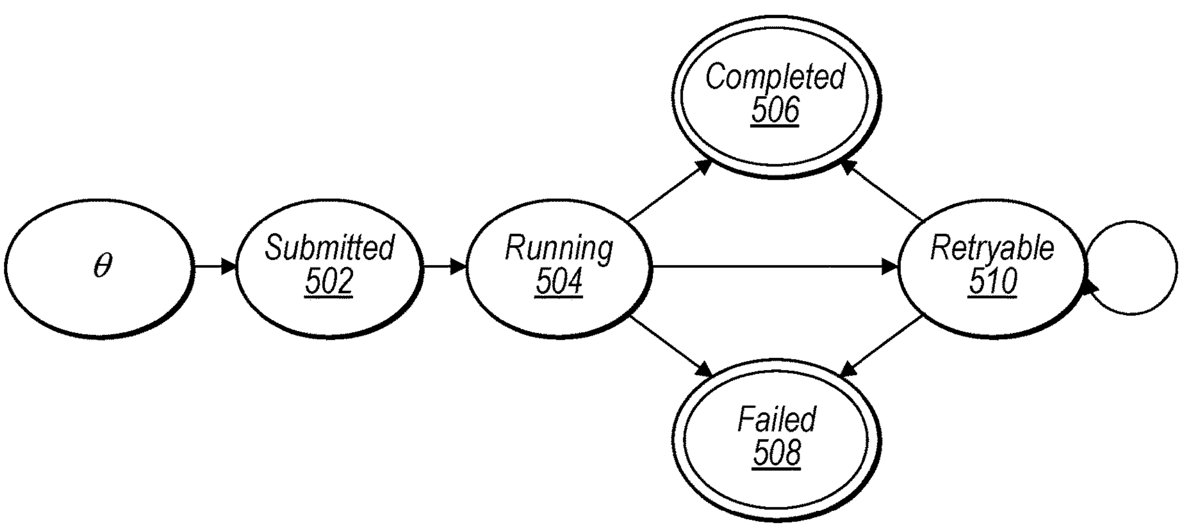
FIG. 5 is a high-level flowchart illustrating various states of an electrical grid simulation implemented by a GS service, according to some embodiments.

FIG. 5 is a high-level flowchart illustrating various states of an electrical grid simulation implemented by a GS service, according to some embodiments.

In the submitted 502 state, the electrical grid simulation is saved into a data store (e.g., a database) and is waiting for a grid simulation solver to receive it. In the running 504 state, a grid simulation solver has received the electrical grid simulation. In the completed 506 state, the solver has successfully finished implementing the simulation and has sent the result(s) to a destination. In the failed 508 state, the solver failed to process the electrical grid simulation or the electrical grid simulation has been retried more than a threshold number of times (e.g., 3 times). In the re-triable 510 state, the solver has received the electrical grid simulation, but the solver has either not responded, died, or has failed with a status that indicates the electrical grid simulation is re-triable. In embodiments, a client may send a request to the service for the current status of any given electrical grid simulation, and the service will return an indication of one of the above states as the current status.

Figure 6:
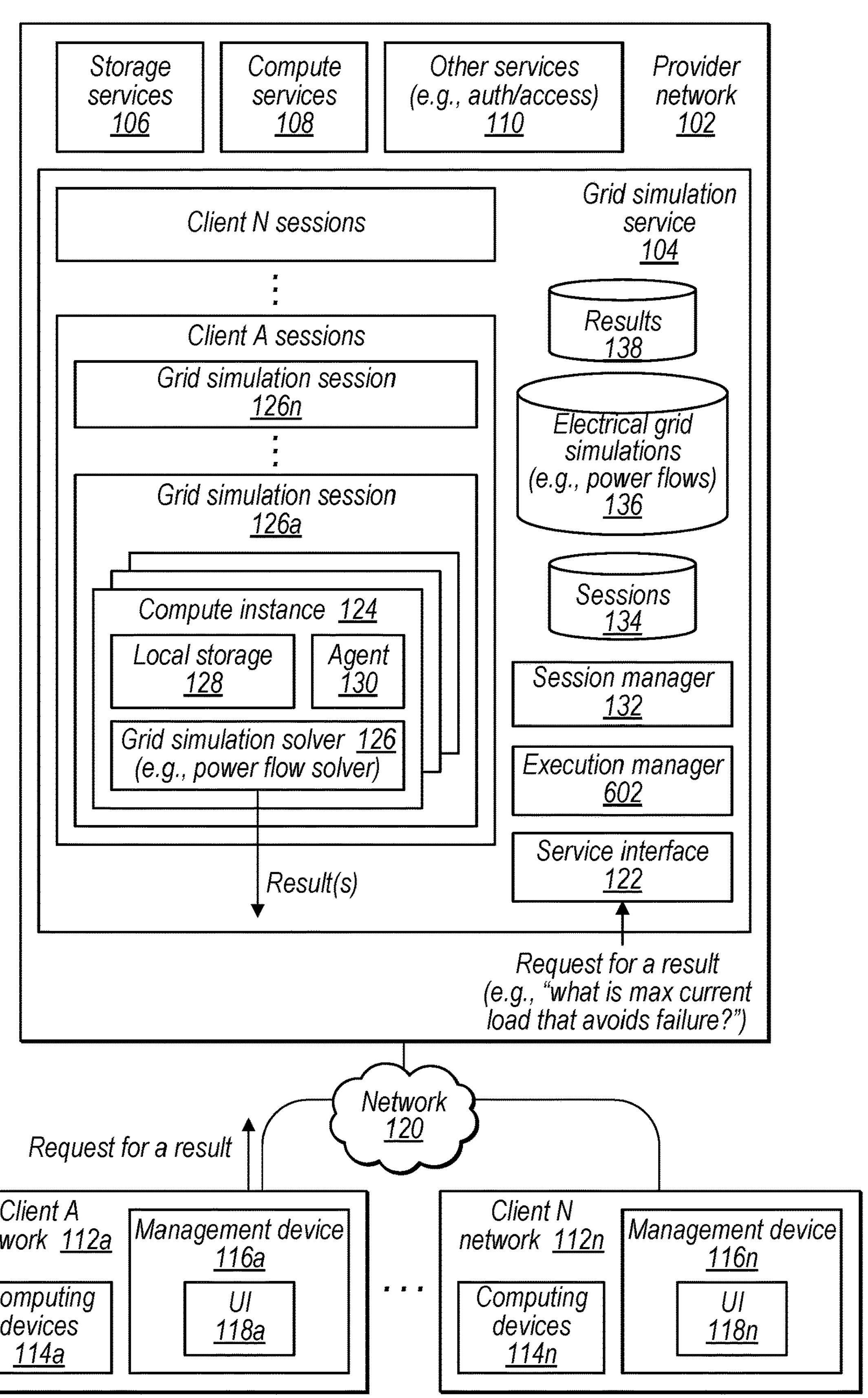
FIG. 6 is a logical block diagram illustrating a system for managing execution of an electrical grid simulation, according to some embodiments.

FIG. 6 is a logical block diagram illustrating a system for managing execution of a grid simulation, according to some embodiments As shown, the system of FIG. 6 may include the same and/or similar components as described for FIG. 1. For example, the provider network 102 includes the GS service 104, which includes any number of sessions 126, compute instances 124, a service interface 122, a session manager 132, sessions 134, electrical grid simulations 136, results 138, etc. As in FIG. 1, any number of clients of the GS service 104 may each have one or more client networks 112.

In the depicted example, the GS service (e.g., using an execution manager 602) may perform at least some or all of the functions discussed herein in order to manage execution of a power flow. As shown, the service receives, from a client, a request for a result to be provided based on implementing an electrical grid simulation. In embodiments, the request may indicate an input parameter for the grid simulation solver to be varied across different iterations of the electrical grid simulation.

In response to the request, the service initiates a simulation session for the electrical grid simulation. The session may be provisioned/configured to: use a grid simulation solver to perform any number of iterations of the electrical grid simulation. In embodiments, each respective iteration uses different values for the input parameter for the grid simulation solver (e.g., a different value for the current load or voltage applied to a particular portion of the electrical grid). The service determines the result based on the iterations (e.g., the maximum current load or voltage that can be applied to the portion of the electrical grid without causing failure of the portion or a component of the grid). The service provides the result to an endpoint (e.g., to the client network/UI and/or a data store at the provider network).

In some embodiments, in order to determine the result, the service determines, based on the iterations, a constraint of the input parameter for the grid simulation solver that causes the grid simulation solver to perform an electrical grid simulation that satisfies one or more criteria. For example, the constraint may be a maximum or minimum value of the input parameter for the grid simulation solver that causes the grid simulation solver to perform an electrical grid simulation that satisfies one or more criteria (e.g., the maximum or minimum current load or voltage that can be applied to the portion of the electrical grid without causing failure of the portion or a component of the grid or without causing a current or voltage at a particular portion of the circuit to exceed a threshold value). In embodiments, the service may receive an indication of the one or more criteria (e.g., via the service interface). In some embodiments, the service may provide any number of other values instead of or in addition to the value of the input parameter as the result to be provided. For example, the service may provide an intermediate value or a final value for any number of output parameters of the electrical grid simulation.

In embodiments, the service may receive, from the client, the electrical grid simulation to be implemented or an identifier of the electrical grid simulation to be implemented. For example, the electrical grid simulation may be stored by the service. In various embodiments, the service may identify, based on the request, the input parameter for the grid simulation solver that is to be varied across different iterations. For example, the service may determine, based on analysis (e.g., using ML models) of the text input or speech input of the request, the input parameter for the grid simulation solver to be varied across the respective iterations.

For example, if a user types a query "what is the maximum current load that can be applied to portion X of the electrical grid without causing failure of component Y," then the service may determine, based on analyzing the query, that the input value to be varied is the maximum current load applied to portion X of the grid. In some embodiments, the service may determine, based on the request, determine, based on analysis (e.g., using ML models) of the text input or speech input of the request, different input parameters for any number of different simulation solvers to be varied across the respective iterations, where each solver implements a different portion of the electrical grid simulation for a different corresponding portion of the electrical grid. The result(s) of any of the above simulations may then be provided to an endpoint.

In some embodiments, the service may receive, from the client, a selection of the input parameter from among a plurality of input parameters that are available for the grid simulation solver to be varied across the respective iterations (e.g., from a drop-down menu of a graphical UI). In embodiments, the service may receive, from the client, an indication of the grid simulation solver to be used to perform the plurality of iterations (e.g., from a drop-down menu of a graphical UI). In some embodiments, the service may receive, from the client, an indication of an amount of compute resources (e.g., CPUs/GPUs) and/or an amount of memory to be used for the simulation session or a portion of the session.

Figure 7:
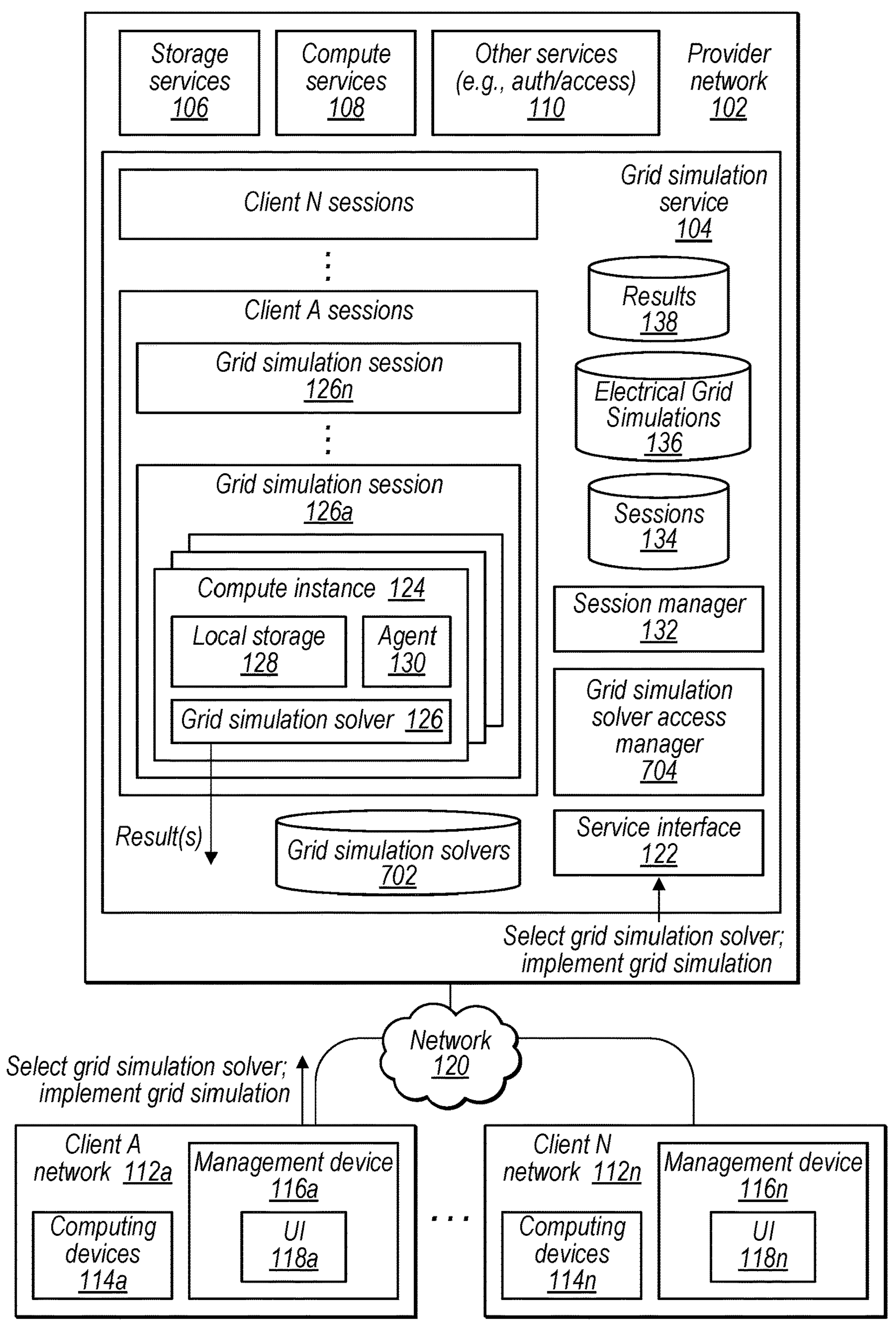
FIG. 7 is a logical block diagram illustrating a system for providing solvers for execution of an electrical grid simulation, according to some embodiments.

FIG. 7 is a logical block diagram illustrating a system for providing solvers for execution of a grid simulation, according to some embodiments.

As shown, the system of FIG. 7 may include the same and/or similar components as described for FIG. 1. For example, the provider network 102 includes the GS service 104, which includes any number of sessions 126, compute instances 124, a service interface 122, a session manager 132, sessions 134, electrical grid simulations 136, results 138, etc. As in FIG. 1, any number of clients of the GS service 104 may each have one or more client networks 112.

In the depicted example, the GS service (e.g., using grid simulation solvers 702 and/or a grid simulation solver access manager) may perform at least some or all of the functions discussed herein in order to provide solvers for execution of a grid simulation. As shown, the service receives, from a client, selection of a grid simulation solver from among any number of grid simulation solvers available for selection at the GS service to implement electrical grid simulations (e.g., from a drop-down menu of a graphical UI provided by the service).

Based on the selection (e.g., in response to the selection of the particular solver to be used), the service initiates a simulation session, wherein the simulation session is configured/provisioned to use the selected grid simulation solver to implement electrical grid simulations on behalf of the client (e.g., in any number of compute instances or containers) in order to generate one or more results, as described herein.

At a later point, the service may receive, from the client, a request to implement any number of electrical grid simulations. In response to receiving the request, the service: implements, in the simulation session, the electrical grid simulation(s) using the selected grid simulation solver to generate one or more results; and provides, to an endpoint, the one or more results.

In embodiments, the grid simulation solvers available for selection may include any number of solvers that are provided/uploaded from any number of different sources. For example, any number of solvers may be provided by the provider network (e.g., the service provider itself), by the client, by another client(s) of the GS service, and/or by a third-party provider (e.g., uploaded from a remote network of the third-party provider). In an embodiment, a client of the GS service may upload solver(s) for use by other clients, without using any solvers itself (e.g., without requesting the service to implement any electrical grid simulations). Any given solver provided by/uploaded by a client may be protected/prevented from access by another client, unless the client provides authorization for the access.

In some embodiments, the service may receive, from a client, a request to make a client grid simulation solver available for selection by another client of the GS service to implement electrical grid simulations. In response to the request, the service may cause the client grid simulation solver to be available for selection by the other client to implement electrical grid simulations (e.g., as part of a drop-down menu of graphical UI). The service may then receive, from the other client, selection of the client grid simulation solver from among any number of grid simulation solvers available to the other client for selection to implement electrical grid simulations.

In embodiments, different solvers may be available for selection by different clients, depending on the access that is provided to each client. For example, at a later point in time, the service may receive, from the client, a request to make the client grid simulation solver unavailable for selection by the other client of the GS service to implement electrical grid simulations. In response, the service may cause the client grid simulation solver to be unavailable for selection by the other client to implement electrical grid simulations (e.g., by removing the solver from the drop-down menu of available solvers for the other client). In embodiments, any number of particular solvers may be available for selection by one client but not another client, depending on access/permission assigned to the different clients.

In various embodiments, the service may select the solver from among any number of solvers that are available for selection (e.g., using artificial intelligence/machine learning (ML) and/or any number of criteria). For example, the service may receive, from a client, a request to implement an electrical grid simulation. In response to the request, the service may: select, based on one or more criteria (e.g., using ML and/or any number of criteria), a grid simulation solver from among the plurality of grid simulation solvers available for the client to use; implement an electrical grid simulation (e.g., previously provided by the client) using the selected grid simulation solver to generate a result(s), and provide the result(s) to one or more endpoints. In embodiments, the service may select the solver that will provide the result the fastest (e.g., based on analyzing the type of electrical grid simulation that the client is requesting to be performed). In some embodiments, the client may provide one or more criteria to be used for selection of a solver, and the service will select the solver that satisfies the criteria. For example, the client may request whichever solver will provide the results the fastest, at the least cost/charge to the client, the least cost/charge while providing results by a deadline, etc.

In some embodiments, different solvers may be used to implement simulations for different portions of an electrical grid (e.g., a transmission portion(s) vs. a distribution portion(s). The information provided in the request to implement the electrical grid simulation for the electrical grid may be obtained from any number of different sources (e.g., descriptions of the generation and/or transmission portion(s) of the grid obtained from certain entities and descriptions of the distribution portion(s) of the grid obtained from different entities across a city, metropolitan area, state, nation, etc.).

In embodiments, the service may receive a selection, from the client, of any number of different solvers for any number of different portions of the grid. For example, the service may receive a selection of a first solver to be used for a first portion of an electrical grid and a selection of a second solver to be used for a second portion of the electrical grid. In response to receiving a request to implement an electrical grid simulation for the electrical gird, the service may: implement the electrical grid simulation using the first solver to simulate the first portion of the electrical grid and the second solver to simulate the second portion of the electrical grid, in order to generate result(s) based on both of the simulations; and provide the result(s) to one or more endpoints.

In various embodiments, the service may select (e.g., using ML/intelligence) the different solvers to be used for each portion of the electrical grid to be simulated (e.g., by determining the solver that obtains results the fastest/most efficiently and/or for the least cost/charge to the client within a deadline, for each portion to be simulated). The above techniques may allow a client to easily simulate an electrical grid of any size across any geographical area and/or any number of utilities/grid operators (e.g., for any number of generation, transmission, and distribution portions of the grid).

Figure 8:
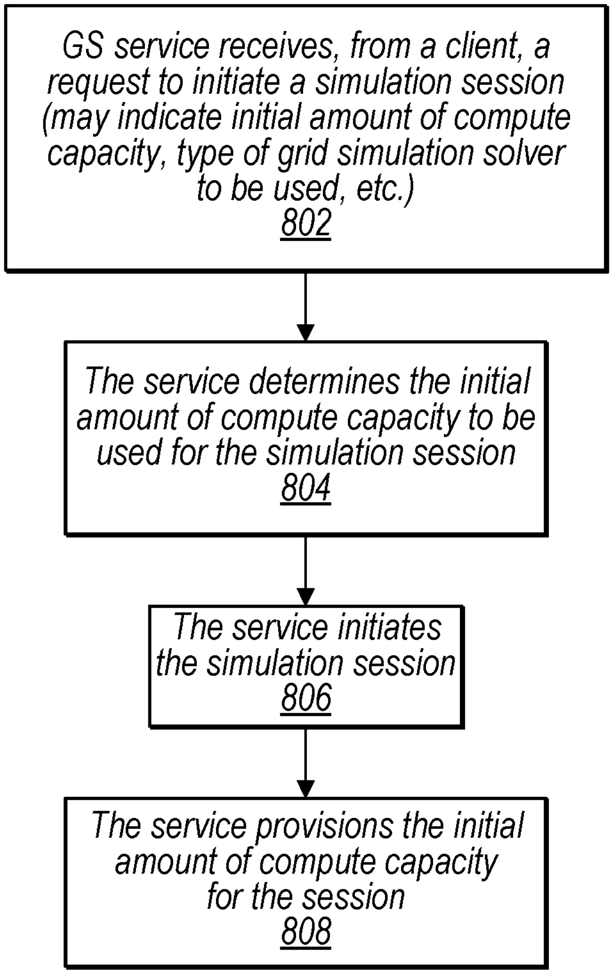
FIG. 8 is a high-level flowchart illustrating various methods and techniques to initiate a grid simulation session at a GS service, according to some embodiments.

FIG. 8 is a high-level flowchart illustrating various methods and techniques to initiate a power flow simulation session at a GS service, according to some embodiments. In various embodiments, any of the functionality described for any portions of the flowcharts 8-11 may be performed by any of the components of FIGS. 1-7 and/or 12.

Figure 9:
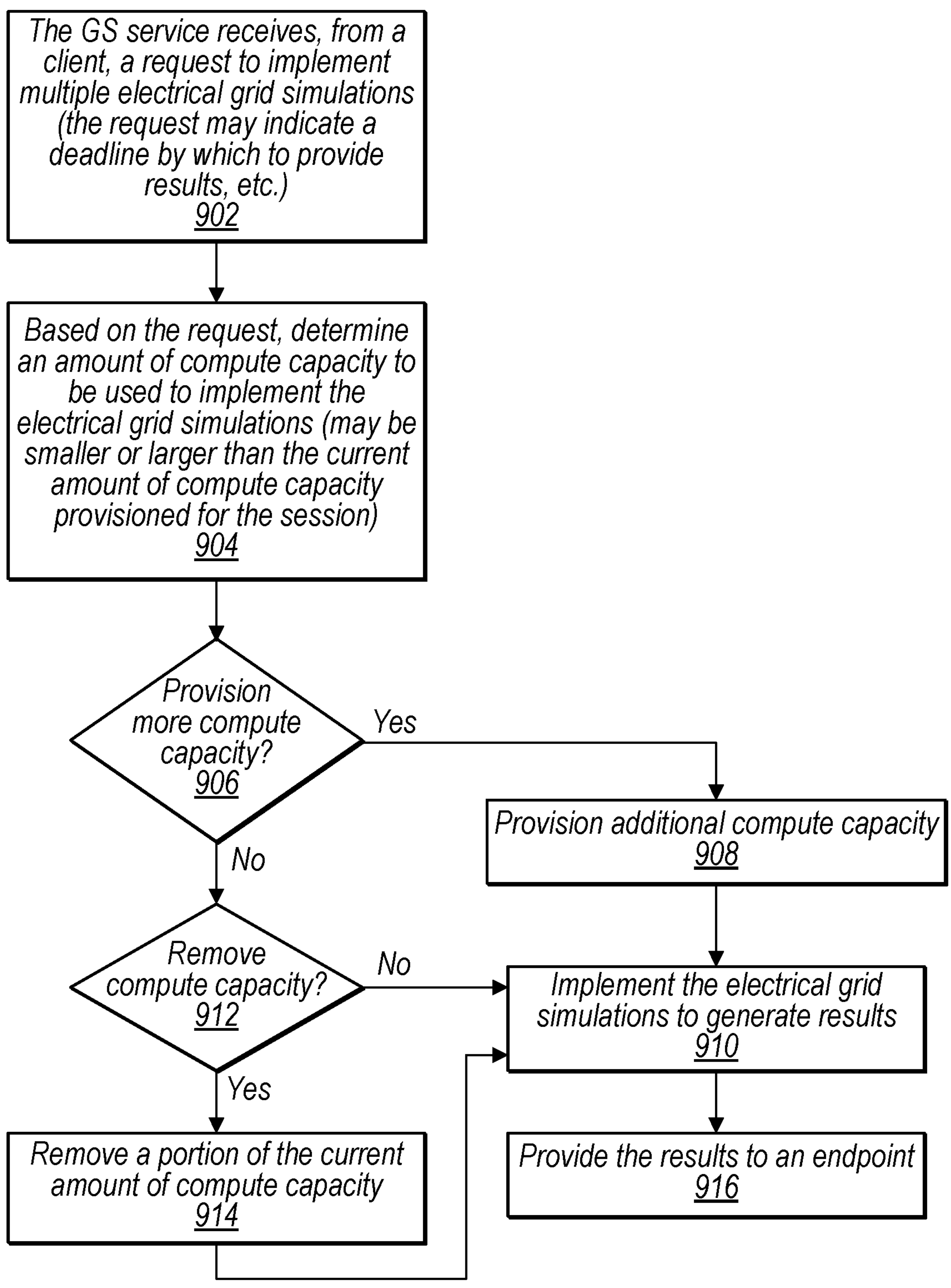
FIG. 9 is a high-level flowchart illustrating various methods and techniques to provide scalable electrical grid simulations, according to some embodiments.
Figure 10:
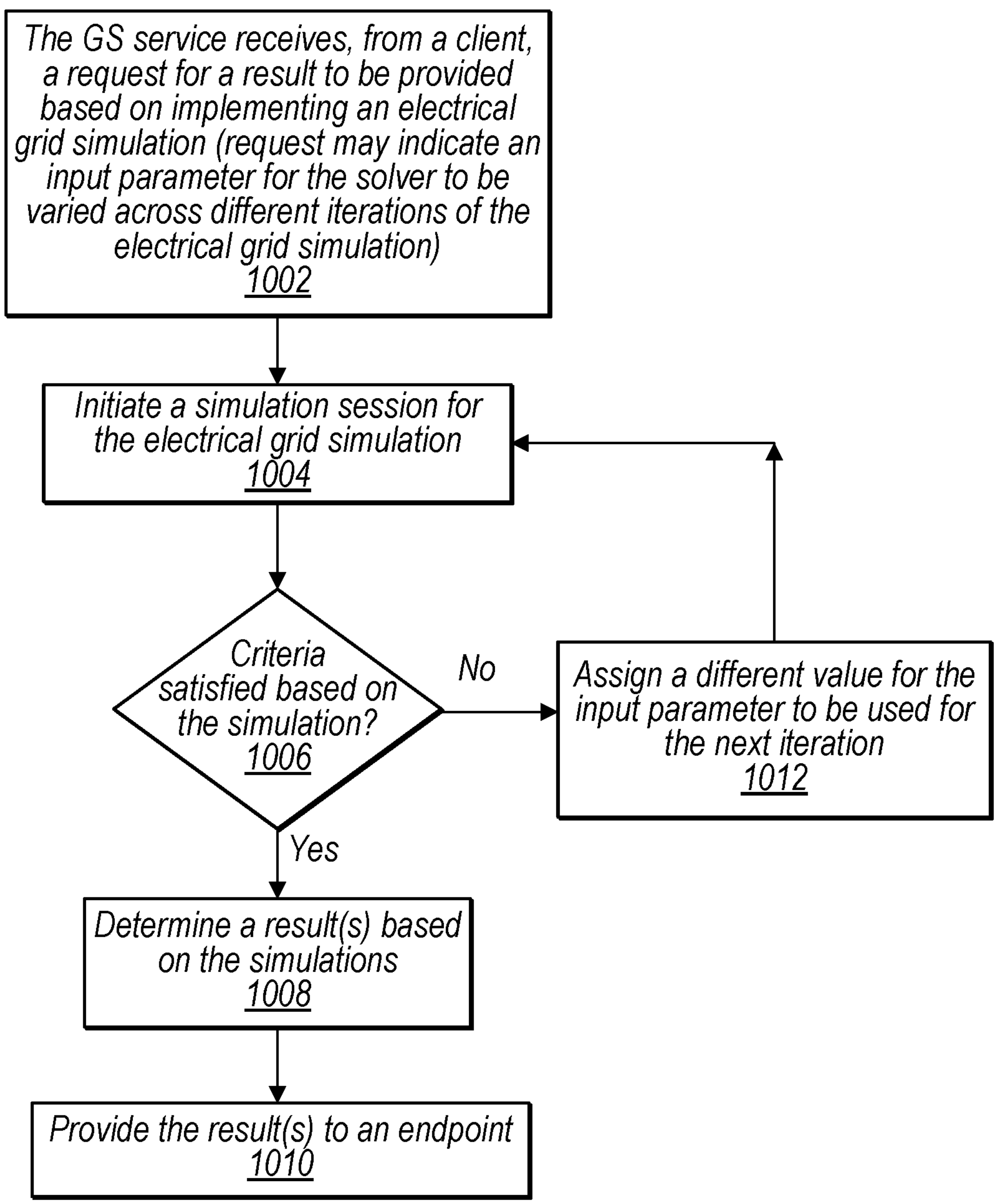
FIG. 10 is a high-level flowchart illustrating various methods and techniques to manage execution of an electrical grid simulation, according to some embodiments.
Figure 11:
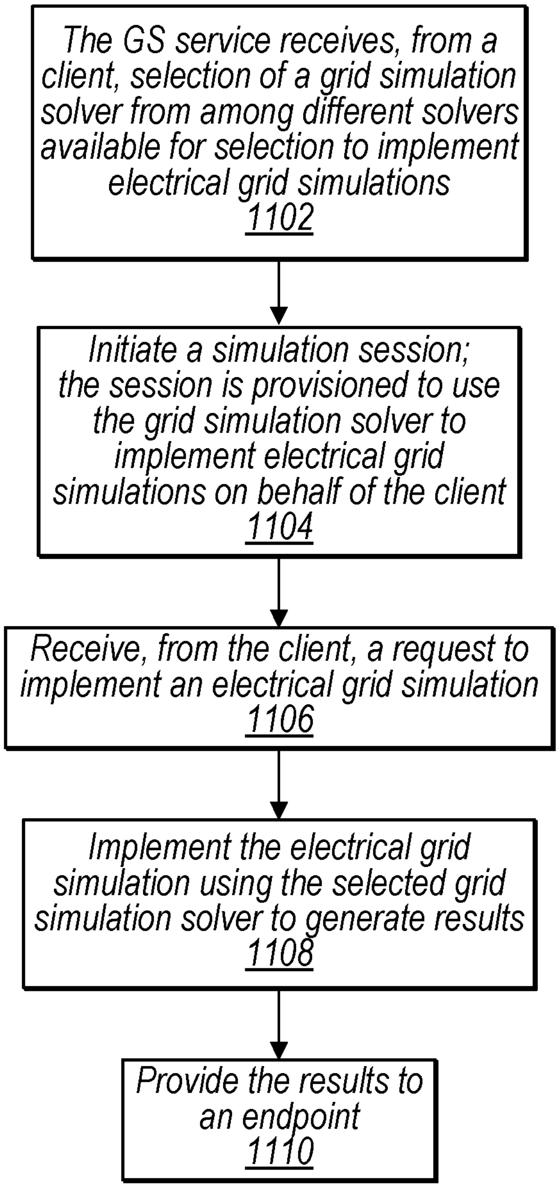
FIG. 11 is a high-level flowchart illustrating various methods and techniques to provide solvers for execution of an electrical grid simulation, according to some embodiments.

These techniques, as well as the techniques discussed with regard to FIGS. 9-11, may be implemented using components or systems as described above with regard to FIG. 1-7 or 12, as well as other types of components or systems, and thus the following discussion is not intended to be limiting as to the other types of systems that may implement the described techniques. For example, any of the techniques may be implemented by an update deployment service of a provider network and/or by a local service/application on one or more computing devices of a client network.

At block 802, the GS service receives, from a client, a request to initiate a simulation session. In embodiments, the request may indicate an initial amount of compute capacity (e.g., number of compute instances, number of containers, amount of memory and/or CPUs). At block 804, the service determines the initial amount of compute capacity to be used for the simulation session. At block 806, the service initiates the simulation session. At block 808, the service provisions the initial amount of compute capacity for the session. The session may then be ready to implement electrical grid simulations on behalf of a client.

FIG. 9 is a high-level flowchart illustrating various methods and techniques to provide scalable electrical grid simulations, according to some embodiments.

At block 902, the GS service receives, from a client, a request to implement any number of electrical grid simulations (e.g., multiple simulations). In embodiments, the request may indicate any of the criteria discussed herein (e.g., a deadline by which to provide results, etc.). At block 904, based on the request, the service determines an amount of compute capacity to be used to implement the electrical grid simulations (it might be smaller or larger than the current amount of compute capacity provisioned for the session).

At block 906, if the service determines that more compute capacity is needed (e.g., the determined amount of compute capacity to be used is larger than the current amount), then the process proceeds to block 908, where the service provisions additional compute capacity. At block 910, the service implements the electrical grid simulations to generate result(s).

Returning to block 906, if the service determines that more compute capacity is not needed (e.g., the determined amount is larger than the current amount), then block 912, the service determines whether to remove compute capacity (e.g., the determined amount of compute capacity to be used is smaller than the current amount). If not, then at block 910, the service implements the electrical grid simulations to generate result(s). However, if the service determines to remove compute capacity, then at block 914, the service removes a portion of the current amount of compute capacity (e.g., removes one or compute instances or containers). The process then proceeds to block 910. After results are generated at 910, then at block 916, the service provides the results to an endpoint.

FIG. 10 is a high-level flowchart illustrating various methods and techniques to manage execution of an electrical grid simulation, according to some embodiments.

At block 1002, the GS service receives, from a client, a request for a result to be provided based on implementing an electrical grid simulation. The request may indicate an input parameter for the solver to be varied across different iterations of the electrical grid simulation. At block 1004, the service initiates a simulation session for the electrical grid simulation.

At block 1006, the service determines whether one or more criteria are satisfied, based on the simulation (e.g., based on results of the simulation meets one or more criteria). If so, then at block 1008, the service determines result(s) based on the simulations (e.g., the iterations of the electrical grid simulation) and at block 1010, the service provides the result(s) to an endpoint. Returning to block 1006, if the service determines that the one or more criteria are not satisfied, based on the simulation, then at block 1012, the service assigns a different value for the input parameter to be used for the next iteration. The process then returns to block 1004.

FIG. 11 is a high-level flowchart illustrating various methods and techniques to provide solvers for execution of an electrical grid simulation, according to some embodiments.

At block 1102, the GS service from a client, selection of a grid simulation solver from among different solvers available for selection to implement electrical grid simulations.

At block 1104, the service initiates a simulation session. The session is provisioned to use the grid simulation solver to implement electrical grid simulations on behalf of the client.

At block 1106, the service receives, from the client, a request to implement an electrical grid simulation. At block 1108, the service implements the selected grid simulation solver to generate result(s). At block 1110, the service provides the result(s) to an endpoint.

The methods described herein may in various embodiments be implemented by any combination of hardware and software. For example, in one embodiment, the methods may be implemented by a computer system (e.g., a computer system as in FIG. 12) that includes one or more processors executing program instructions stored on a computer-readable storage medium coupled to the processors.

The program instructions may implement the functionality described herein (e.g., the functionality of the GS service, other services, software, devices, and any other components/devices that implement the techniques described herein). The various methods as illustrated in the figures and described herein represent example embodiments of methods. The order of any method may be changed, and various elements may be added, reordered, combined, omitted, modified, etc.

Figure 12:
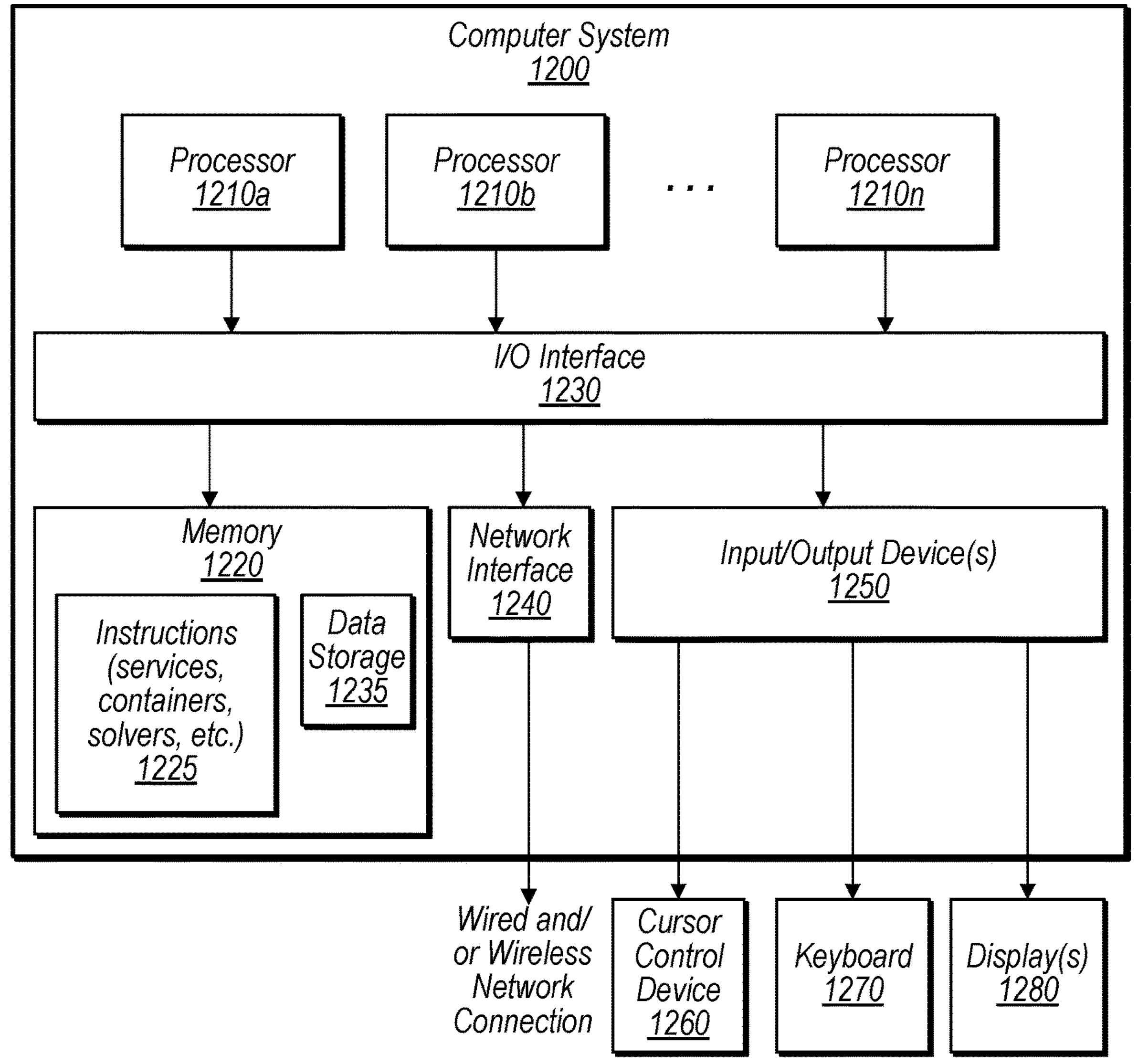
FIG. 12 is a block diagram illustrating an example computing system, according to some embodiments.

Embodiments to provide scalable electrical grid simulations, manage execution of an electrical grid simulation, and provide solvers for execution of an electrical grid simulation, which may interact with various other systems or devices. One such computer system is illustrated by FIG. 12. In different embodiments, computer system 1200 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 1200 includes one or more processors 1210 coupled to a system memory 1220 via an input/output (I/O) interface 1230. Computer system 1200 further includes a network interface 1240 coupled to I/O interface 1230, and one or more input/output devices 1250, such as cursor control device 1260, keyboard 1270, and display(s) 1280. Display(s) may include standard computer monitor(s) and/or other display systems, technologies or devices, in one embodiment.

In some embodiments, it is contemplated that embodiments may be implemented using a single instance of computer system 1200, while in other embodiments multiple such systems, or multiple nodes making up computer system 1200, may host different portions or instances of embodiments. For example, in one embodiment some elements may be implemented via one or more nodes of computer system 1200 that are distinct from those nodes implementing other elements.

In various embodiments, computer system 1200 may be a uniprocessor system including one processor 1210, or a multiprocessor system including several processors 1210 (e.g., two, four, eight, or another suitable number). Processors 1210 may be any suitable processor capable of executing instructions, in one embodiment. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

In some embodiments, at least one processor 1210 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms.

For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1220 may store program instructions 1225 and/or data accessible by processor 1210, in one embodiment. In various embodiments, system memory 1220 may be implemented using any suitable memory technology, such as static random access memory (SRAM), synchronous dynamic RAM (SDRAM), nonvolatile/Flash-type memory, or any other type of memory.

In the illustrated embodiment, program instructions and data implementing desired functions, such as those described above (e.g., the GS service, other services, software, and any other components/devices, etc.) are shown stored within system memory 1220 as program instructions 1225 and data storage 1235, respectively. In other embodiments, program instructions and/or data may be received, sent or stored upon different types of computer-accessible media or on similar media separate from system memory 1220 or computer system 1200.

A computer-accessible medium may include non-transitory storage media or memory media such as magnetic or optical media, e.g., disk or CD/DVD-ROM coupled to computer system 1200 via I/O interface 1230. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1240, in one embodiment.

In one embodiment, I/O interface 1230 may be coordinate I/O traffic between processor 1210, system memory 1220, and any peripheral devices in the device, including network interface 1240 or other peripheral interfaces, such as input/output devices 1250. In some embodiments, I/O interface 1230 may perform any necessary protocol, timing or other data transformations to convert data signals from one component (e.g., system memory 1220) into a format suitable for use by another component (e.g., processor 1210).

In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. In addition, in some embodiments some or all of the functionality of I/O interface 1230, such as an interface to system memory 1220, may be incorporated directly into processor 1210.

Network interface 1240 may allow data to be exchanged between computer system 1200 and other devices attached to a network, such as other computer systems, or between nodes of computer system 1200, in one embodiment. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1250 may, in some embodiments, include one or more display terminals, keyboards, keypads, touchpads, scanning devices, voice or optical recognition devices, or any other devices suitable for entering or retrieving data by one or more computer system 1200, in one embodiment. Multiple input/output devices 1250 may be present in computer system 1200 or may be distributed on various nodes of computer system 1200, in one embodiment. In some embodiments, similar input/output devices may be separate from computer system 1200 and may interact with one or more nodes of computer system 1200 through a wired or wireless connection, such as over network interface 1240.

As shown in FIG. 12, memory 1220 may include program instructions 1225 that implement the various embodiments of the systems as described herein, and data store 1235, comprising various data accessible by program instructions 1225, in one embodiment. In one embodiment, program instructions 1225 may include software elements of embodiments as described herein and as illustrated in the Figures. Data storage 1235 may include data that may be used in embodiments (e.g., power flows, results, software, etc.). In other embodiments, other or different software elements and data may be included.

Those skilled in the art will appreciate that computer system 1200 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device.

Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above.

In some embodiments, instructions stored on a computer-readable medium separate from computer system 1200 may be transmitted to computer system 1200 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:

one or more processors and one or more memories, wherein the one or more memories have stored thereon instructions, which when executed by the one or more processors, cause the one or more processors to implement a grid simulation service (GS service) for a plurality of clients of a provider network, wherein the GS service is configured to, for a given client:

receive, from the client, a request to initiate a simulation session for an electrical grid;

in response to the request to initiate the simulation session:

determine an initial amount of compute capacity to be provisioned for the simulation session, wherein the initial amount of compute capacity is configured to use a grid simulation solver to implement electrical grid simulations on behalf of the client; and initiate the simulation session; and provision the initial amount of compute capacity;

receive, from the client, a request to implement a plurality of electrical grid simulations;

in response to the request to implement the plurality of electrical grid simulations:

determine, based on the request to implement the plurality of electrical grid simulations, an amount of compute capacity of the simulation session to be used to implement the plurality of electrical grid simulations by the GS service of the provider network;

implement the plurality of electrical grid simulations using the grid simulation solver and the amount of compute capacity to generate results, wherein the amount of compute capacity comprises at least a portion of the initial compute capacity; and provide, to an endpoint, the results of the simulation of the plurality of electrical grid simulations.

2. The system as recited in claim 1, wherein the to determine, based on the request to implement the plurality of electrical grid simulations, an amount of compute capacity to be used to implement the plurality of electrical grid simulations, the GS service is configured to:

determine, based on one or more criteria, the amount of compute capacity to be used to implement the plurality of electrical grid simulations as a larger amount of compute capacity than the initial amount of compute capacity.

3. The system as recited in claim 2, wherein to implement the plurality of electrical grid simulations using the grid simulation solver and the amount of compute capacity to generate results, the GS service is configured to:

provision an additional amount of compute capacity to use the grid simulation solver to implement electrical grid simulations on behalf of the client.

4. The system as recited in claim 1, wherein the to determine, based on the request to implement the plurality of electrical grid simulations, an amount of compute capacity to be used to implement the plurality of electrical grid simulations, the GS service is configured to:

determine, based on one or more criteria, the amount of compute capacity to be used to implement the plurality of electrical grid simulations as a smaller amount of compute capacity than the initial amount of compute capacity.

5. The system as recited in claim 4, wherein the to implement the plurality of electrical grid simulations using the grid simulation solver and the amount of compute capacity to generate results, the GS service is configured to:

remove a portion of the initial amount of compute capacity.

6. A method, comprising:

performing, by a GS service implemented by one or more computing devices of a provider network:

receiving, from a client, a request to implement a plurality of electrical grid simulations;

in response to the request to implement the plurality of electrical grid simulations:

determining, based on the request to implement the plurality of electrical grid simulations, an amount of compute capacity of a session to be used to implement the plurality of electrical grid simulations by the GS service of the provider network, wherein the session comprises a current amount of compute capacity provisioned to implement electrical grid simulations on behalf of the client;

implementing the plurality of electrical grid simulations using grid simulation solvers and the amount of compute capacity to generate results, wherein the amount of compute capacity comprises at least a portion of the current amount of compute capacity; and providing, to an endpoint, the results of the simulation of the plurality of electrical grid simulations.

7. The method as recited in claim 6, wherein determining, based on the request to implement the plurality of electrical grid simulations, an amount of compute capacity to be used to implement the plurality of electrical grid simulations comprises:

determining, based on one or more criteria, the amount of compute capacity to be used to implement the plurality of electrical grid simulations as a larger amount of compute capacity than the current amount of compute capacity.

8. The method as recited in claim 7, wherein implementing the plurality of electrical grid simulations using the grid simulation solver and the amount of compute capacity to generate results comprises:

provisioning an additional amount of compute capacity to implement electrical grid simulations on behalf of the client.

9. The method as recited in claim 8, wherein provisioning the additional amount of compute capacity comprises:

determining, based on the request to implement the plurality of electrical grid simulations, a type of hardware to be used to provide the additional amount of compute capacity.

10. The method as recited in claim 6, wherein determining, based on the request to implement the plurality of electrical grid simulations, an amount of compute capacity to be used to implement the plurality of electrical grid simulations comprises:

determining, based on one or more criteria, the amount of compute capacity to be used to implement the plurality of electrical grid simulations as a smaller amount of compute capacity than the current amount of compute capacity.

11. The method as recited in claim 6, further comprising:

receiving, from the client, another request to implement a plurality of other electrical grid simulations;

in response to the other request to implement the plurality of other electrical grid simulations:

determining, based at least on the other request to implement the plurality of other electrical grid simulations and a state of the current amount of compute capacity, an additional amount of compute capacity to be provisioned for the session to implement electrical grid simulations on behalf of the client.

12. The method as recited in claim 6, wherein the session implements different types of power solvers.

13. The method as recited in claim 12, wherein implementing the plurality of electrical grid simulations using grid simulation solvers using the amount of compute capacity to generate results comprises:

sending output from one type of grid simulation solver to another type of grid simulation solver.

14. The method as recited in claim 6, further comprising, prior to receiving the request to implement a plurality of electrical grid simulations:

receiving, from the client, an indication of an initial amount of compute capacity to be used for the session.

15. One or more non-transitory computer-accessible storage media storing program instructions that when executed on or across one or more processors of a provider network cause the one or more processors to implement a GS service to:

receive, from a client, a request to implement a plurality of electrical grid simulations;

in response to the request to implement the plurality of electrical grid simulations:

determine, based on the request to implement the plurality of electrical grid simulations, an amount of compute capacity of a session to be used to implement the plurality of electrical grid simulations by the GS service of the provider network, wherein the session comprises a current amount of compute capacity provisioned to implement electrical grid simulations on behalf of the client;

implement the plurality of electrical grid simulations using grid simulation solvers and the amount of compute capacity to generate results, wherein the amount of compute capacity comprises at least a portion of the current amount of compute capacity; and provide, to an endpoint, the results of the simulation of the plurality of electrical grid simulations.

16. The one or more storage media as recited in claim 15, wherein to determine, based on the request to implement the plurality of electrical grid simulations, an amount of compute capacity to be used to implement the plurality of electrical grid simulations, the program instructions when executed on or across the one or more processors further cause the one or more processors to:

determine, based on one or more criteria, the amount of compute capacity to be used to implement the plurality of electrical grid simulations as a larger amount of compute capacity than the current amount of compute capacity.

17. The one or more storage media as recited in claim 16, wherein to implement the plurality of electrical grid simulations using the grid simulation solver and the amount of compute capacity to generate results, the program instructions when executed on or across the one or more processors further cause the one or more processors to:

provision an additional amount of compute capacity to implement electrical grid simulations on behalf of the client.

18. The one or more storage media as recited in claim 16, wherein the one or more criteria comprise a maximum amount of time for the GS service to generate or provide the results, or a deadline by which the GS service is to generate or provide the results.

19. The one or more storage media as recited in claim 16, wherein to implement the plurality of electrical grid simulations using the grid simulation solver and the amount of compute capacity to generate results, the program instructions when executed on or across the one or more processors further cause the one or more processors to:

implement the plurality of electrical grid simulations in at least a portion of the amount of compute capacity in parallel.

20. The one or more storage media as recited in claim 15, wherein the program instructions when executed on or across the one or more processors further cause the one or more processors to, prior to reception of the request to implement a plurality of electrical grid simulations:

receive, from the client, an indication of an initial amount of compute capacity to be used for the session.

* * * * *